(12) United States Patent
Hirsou et al.

(10) Patent No.: US 6,734,587 B2
(45) Date of Patent: May 11, 2004

(54) ROTATING ELECTRICAL MACHINE, IN PARTICULAR ALTERNATOR FOR MOTOR VEHICLE

(75) Inventors: Daniel Hirsou, Berck sur Mer (FR); Eric Le Quere, Equihen Plage (FR); Dirk Schulte, Bry sur Marne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/332,854

(22) PCT Filed: May 15, 2002

(86) PCT No.: PCT/FR02/01631

§ 371 (c)(1), (2), (4) Date: Jan. 14, 2003

(87) PCT Pub. No.: WO02/093717

PCT Pub. Date: Nov. 21, 2002

(65) Prior Publication Data

US 2004/0000817 A1 Jan. 1, 2004

(30) Foreign Application Priority Data

May 15, 2001 (FR) .............................................. 01 06386

(51) Int. Cl.⁷ .............................................. H02K 11/00
(52) U.S. Cl. ..................... 310/68 D; 310/52; 310/54; 310/64
(58) Field of Search ................ 310/68 D, 52–59, 310/64

(56) References Cited

U.S. PATENT DOCUMENTS

| 3,970,881 | A | * | 7/1976 | Sato ........................... 310/68 D |
| 5,646,838 | A | | 7/1997 | Keidar et al. |
| 5,682,070 | A | * | 10/1997 | Adachi et al. ................. 310/71 |
| 5,729,063 | A | * | 3/1998 | Adachi et al. ............. 310/68 D |
| 5,757,096 | A | * | 5/1998 | DuBois et al. ............ 310/68 D |
| 5,812,388 | A | * | 9/1998 | Keidar et al. ................ 363/145 |
| 5,903,073 | A | * | 5/1999 | Mukai .......................... 310/64 |
| 6,538,352 | B2 | * | 3/2003 | Asao ........................ 310/68 D |

FOREIGN PATENT DOCUMENTS

| DE | 197 05 228 A1 | 8/1998 |
| EP | 0 823 554 A1 | 2/1998 |
| EP | 0 969 583 A1 | 1/2000 |

* cited by examiner

*Primary Examiner*—Thanh Lam
(74) *Attorney, Agent, or Firm*—Liniak, Berenato & White

(57) ABSTRACT

The invention relates to a rotary electric machine comprising a rear bearing (2), an arrangement (1) for rectifying the current produced by the machine, which comprises a number of positive diodes (8) supported by a heat dissipater in the overall form of a plate (9) and a number of negative diodes (10) supported by support means in the form of a plate advantageously forming part of the rear bearing, the plate (9) supporting the positive diodes (8) comprising a great many cooling ribs which have the shape of fins (18, 19) extending practically radially across the plate, while an opening (20) for the passage of cooling air is made between each pair of adjacent fins (18, 19), some fins (18) extending practically as far as the outer periphery of the support plate (9).

7 Claims, 6 Drawing Sheets

ROTATING ELECTRICAL MACHINE, IN PARTICULAR ALTERNATOR FOR MOTOR VEHICLE

FIELD OF THE INVENTION

The invention relates to a rotary electric machine, particularly a motor vehicle alternator, of the type comprising a front bearing and a rear bearing on which stator windings are fixed and in which a rotor shaft is mounted so that it can rotate, a rectifier arrangement comprising a number of positive diodes supported by a heat dissipater in the overall form of a support plate and a number of negative diodes supported by a support element in the form of a plate, these plates being axially juxtaposed and fixed to the rear bearing, and a device affording cooling by circulating an axial stream of a cooling fluid, such as air, through axial openings in said plates, at least some openings in the plate supporting the positive diodes being provided with cooling ribs. Advantageously, the plate supporting the negative diodes forms part of the rear bearing.

PRIOR ART

An electric machine of this type is described in document DE-A-19705228. The openings which are made in the plate supporting the positive diodes comprise five openings of significant angular aperture two of which have a trapezoidal overall shape. These trapezoidal openings are each surrounded by a rib projecting axially from the plate.

This cooling device with axial openings admittedly affords more effective cooling than cooling devices without axial openings, but is still not satisfactory.

The same is true of the cooling device described in document U.S. Pat. No. 5,646,838.

In that document, the plate supporting the positive diodes comprises a great many ribs which have the shape of fins extending practically radially across the plate; an opening for the passage of cooling air being provided between each pair of adjacent fins. The fins extend from the inner edge of the support plate and some distance from the outer periphery of the plate and from the positive diodes; the plate being thicker in the region of the fins.

SUBJECT OF THE INVENTION

The object of the invention is to improve the cooling of a rotary machine of the abovementioned type.

To achieve this objective, the machine of the invention is characterized in that first fins extend practically as far as the outer periphery of the plate supporting the positive diodes so that the plate is cooled across its entire radial stretch.

According to another feature of the invention, at least two positive diodes are arranged near the outer periphery of the plate supporting the positive diodes and second fins extend as far as said diodes and close to them. By virtue of this arrangement, the openings can be formed radially under the diodes and the thickness of the plate can be increased at the diodes to allow better cooling of these diodes. Furthermore, the second fins participate in the cooling.

According to yet another feature of the invention, the openings in the plate supporting the positive diodes constitute, with the fins which delimit them, channels for the accelerated flow of cooling air.

Advantageously, at least a first fin is near a positive diode in order to cool the latter even better still.

Advantageously, the rotary electric machine comprises a cover part which, in the region of the fins of the plate supporting the positive diodes, has radial openings corresponding to those of the plate supporting the positive diodes.

These openings are delimited by strips of material or narrow radial ribs. The thickness of these ribs is dependent on the thickness of the fins, the ribs being arranged under the fins. This yields communication between the openings of cover and those of the plate supporting the positive diodes.

The openings of the cover have a greater radial span than those of the plate supporting the positive diodes.

Advantageously, the openings in the cover are split into two by a strip of material or coaxial, that is to say circumferential, ribs. A first part of the openings in the cover faces the passage openings in the plate supporting the positive diodes, the second part of the openings being located at the outer periphery of the cover.

BRIEF DESCRIPTION OF THE DRAWINGS

The invention will be better understood and other objects, features, details and advantages thereof will become more clearly apparent from the explanatory description which will follow, given with reference to the attached schematic drawings which are given solely by way of example illustrating one embodiment of the invention and in which.

DESCRIPTION OF THE PREFERRED EMBODIMENTS OF THE INVENTION

To make the invention and the context in which it falls easier to understand, the conventional overall structure of a rectifier arrangement and its arrangement in a multi-phase alternator for a motor vehicle of the type described, for example, in document EP-B-0515259 (U.S. Pat. No. 5,270,605) to which reference can be made for greater detail will first of all be described, with reference to FIGS. 1 and 2.

Figure 1:
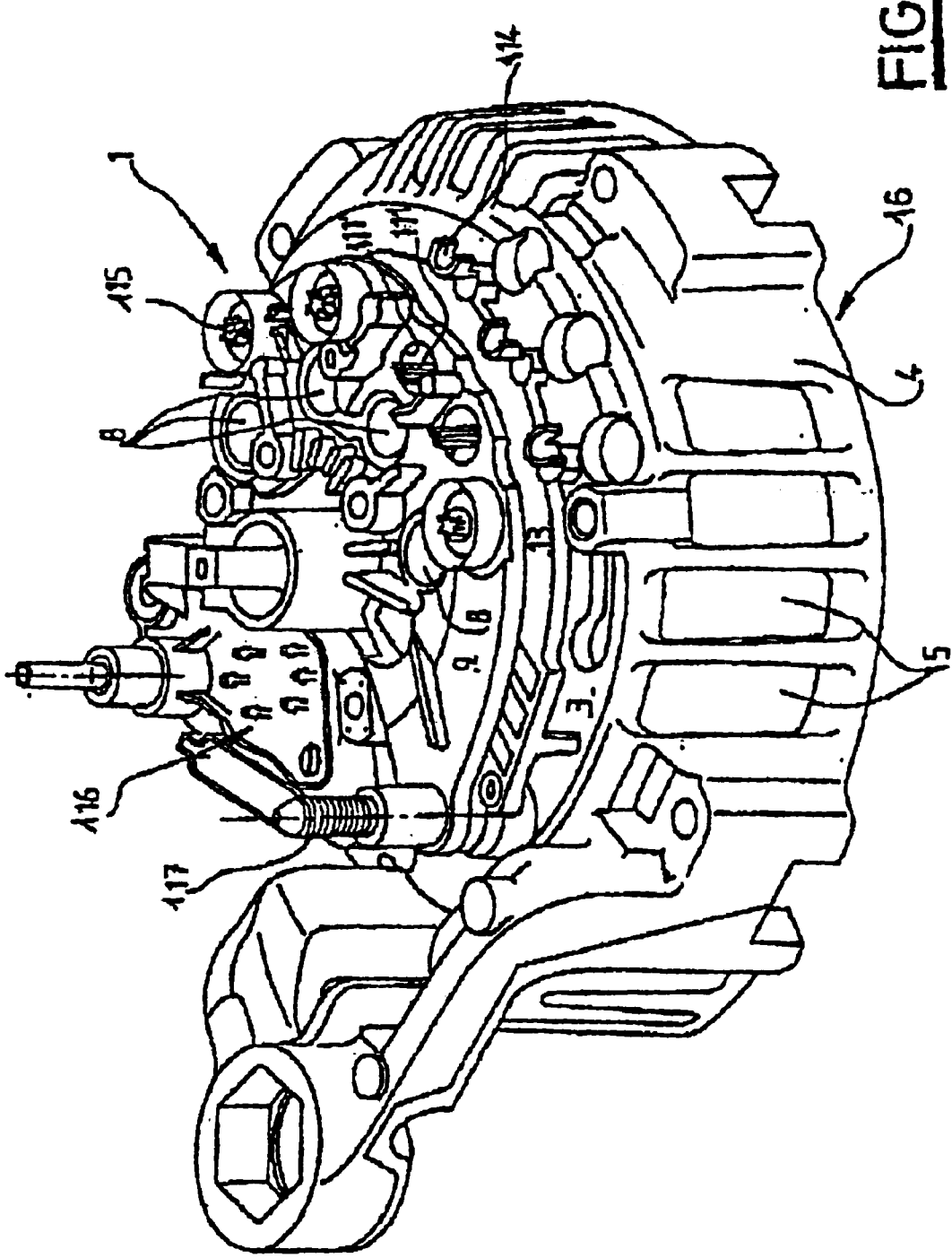
FIG. 1 is a perspective view of a known rectifier arrangement mounted on the rear bearing of a motor vehicle alternator.
Figure 2:
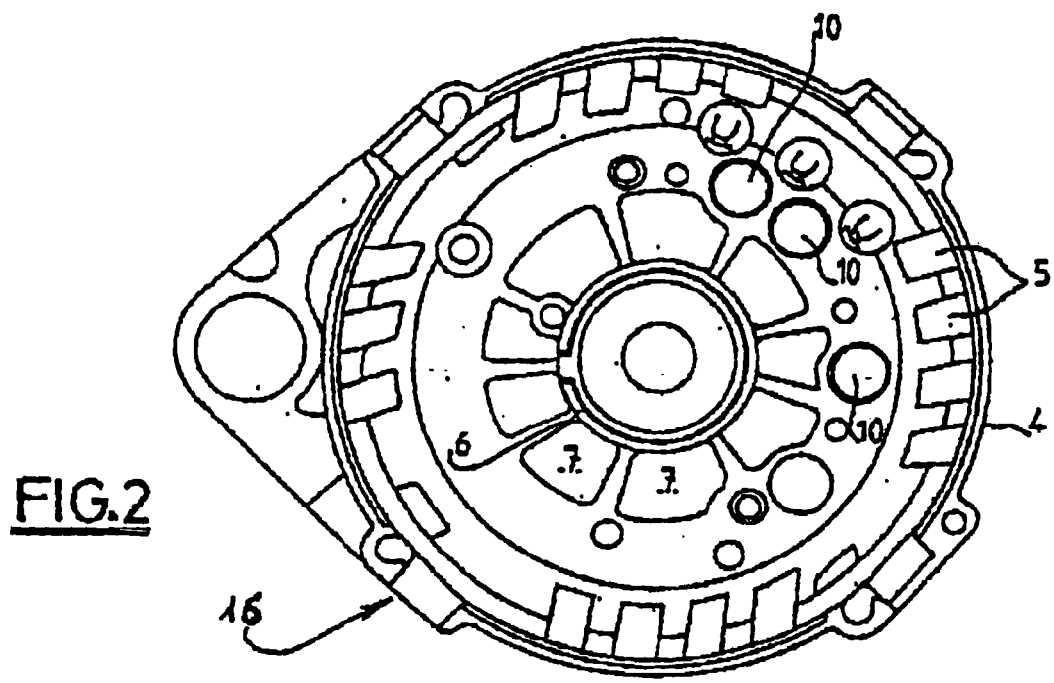
FIG. 2 is an axial view of the inner face of the bearing according to FIG. 1.

As FIG. 1 shows, a rectifier arrangement denoted by the reference numeral 1 is fixed on the rear bearing 16 of the alternator. This rear bearing carries, in the alternator, together with an appropriate front bearing, the rotor shaft and the stator of the alternator. These bearings belong to a fixed support housing of the alternator intended to be fixed to a fixed part of the motor vehicle. It is for that reason that the bearing 16 has a lug. These bearings are electrically conducting, conventionally based on aluminum and connected to ground. The stator comprises a stator body in which the stator windings are fixed, the outputs of which windings are connected to the rectifier arrangement described hereinafter. The rear bearing 16 has the overall form of a cup comprising a part forming central dish 3 oriented transversely and an outer annular rim 4 directed axially and comprising lateral openings 5 for the outlet of the cooling air drawn in by an internal fan associated with the rotor of the alternator and visible in FIG. 3.

The bearing 16 comprises a central cylindrical core 6 for housing, via a ball bearing, the rotor shaft. The dish 3 is provided around the core 6 with air inlet openings 7 intended for the passage of the air used to cool the alternator.

The rectifier arrangement comprises three pairs of positive and negative diodes, a positive diode being duplicated. The diodes are of the type having cylindrical bodies constituting one connection terminal, while the second terminal consists of a tail extending axially from this body. To reduce the axial bulk, the positive and negative diodes are mounted top to toe, the tails of the positive diodes entering the openings 7. The positive diodes shown as 8 are forcibly inserted via their cylindrical body into a heat-dissipating support in the overall form of a plate 9. The negative diodes 10 are forcibly inserted via their cylindrical body into the annular region of the dish 3 of the rear bearing 16, which surrounds the portion comprising the aforesaid openings 7. The tails, denoted by 111, of the negative diodes pass through holes 111' made in the plate 9 supporting the positive diodes 8. This plate 9 is separated from the dish 3 of the bearing 16 by a body in the overall form of a plate 13 made of an electrically insulating material, overmolded over a collection of flat conductors. This plate 13 is known as a connector and, by virtue of its flat conductors, forms with the positive and negative diodes a rectifier bridge for rectifying the current at the output of the stator windings. These windings are designed to form the stator phases and comprise electric conductors connected to the plate 13. Thus, the reference numeral 114 denotes the wire gripper elements for the passage of these conductors intended to connect the phases and the neutral of the three-phase stator of the alternator to the rectifier arrangement. The plate 9 supporting the positive diodes 8 and the intermediate insulating plate 13 are axially juxtaposed and fixed with electrical insulation by screws 115 to the bearing 16. To complete the description, reference numerals 116 and 117 respectively denote the electronic regulating device of the alternator and the output terminal of the alternator which is connected to the dissipating support 9 and to the motor vehicle on-board network, and to the positive terminal of the battery. The plate 9 is made of a metal. Of course, a plastic cover covers the rectifier arrangement 1. This cover is designed to allow air to circulate while at the same time being fixed to the rear bearing. Such a cover can be seen in FIGS. 3 and 8 and is also in the form of a cup.

The constructional measures proposed, according to the invention, to optimize the cooling of the rectifier arrangement will be described hereinafter with reference to FIGS. 3 to 9. The same references will be used for elements which are identical or similar to those shown in FIGS. 1 and 2. The rectifier arrangement 1 according to the invention advantageously applies to motor vehicle alternators or to electric machines of the "alternator/starter motor" type known per se, which are able to operate alternately as an electric motor, particularly a starter motor, or as an alternator. For greater detail, reference can be made to application FR-0003131 filed on Mar. 10, 2000 and published under the number FR-A-2 806 223 or to document WO 01/69762. This alternator/starter motor has the structure of the conventional alternator and has means, advantageously of the magnetic type, for following the rotation of the rotor to inject current into the stator coil at the desired time when the machine operates in starter motor mode.

Figure 3:
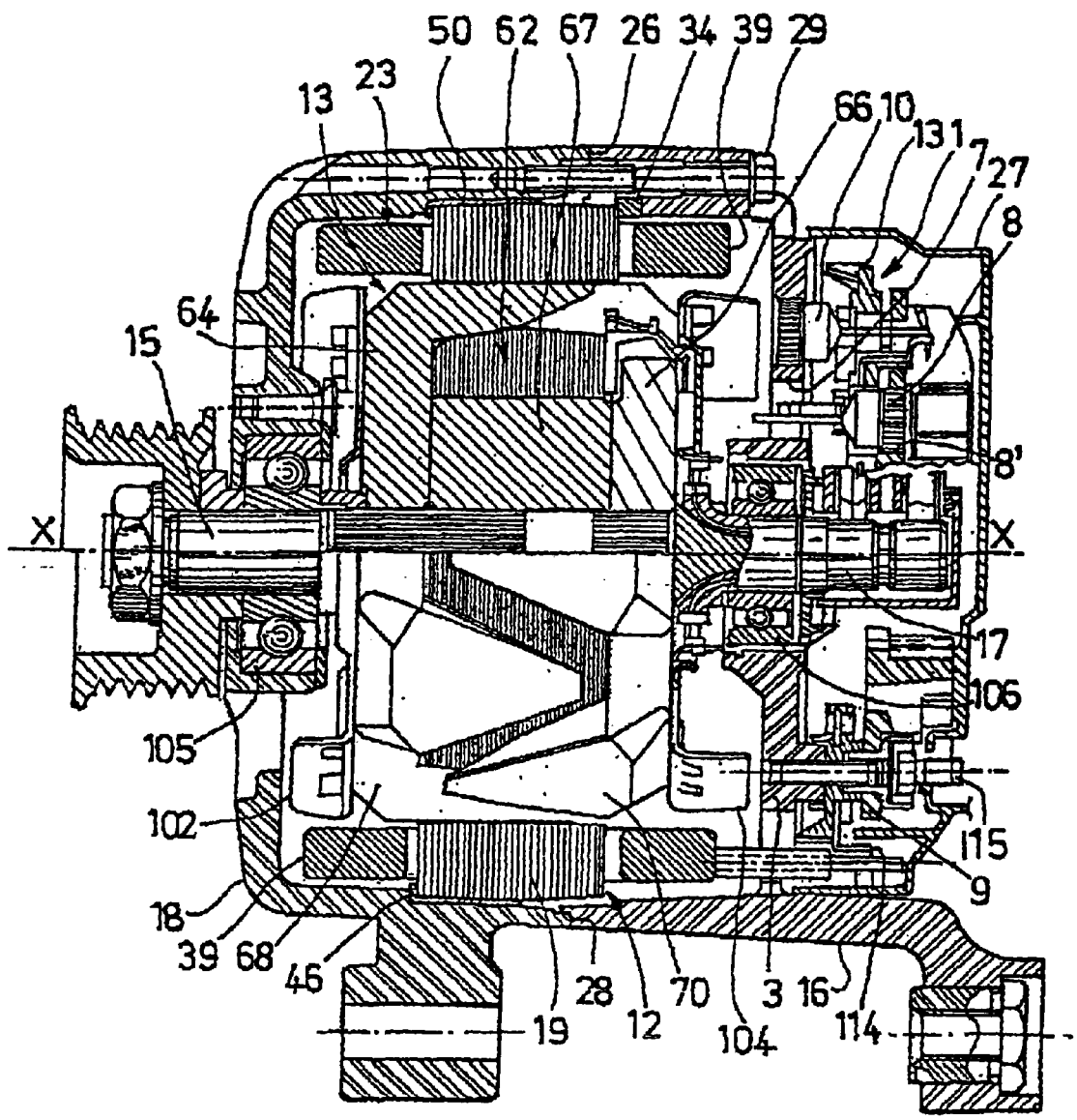
FIG. 3 is a view in axial section of a rotary electric machine in the form of an alternator equipped with a rectifier arrangement according to the invention.

FIG. 3 depicts a compact alternator 10 with internal fans 102, 104 and equipped with a rectifier arrangement according to the invention.

This alternator, here of the multi-phase type, consists mainly of a support casing made in two portions 16, 18 which are perforated so that air can circulate. The casing internally bears two main components which are the stator 12 and the rotor 13 as described, for example, in document U.S. Pat. No. 527,605 (EP B 0 515 259) to which reference can be made for further details.

The stator 12 surrounds the rotor 13 which is secured to a shaft 15 to the rear end of which are fixed two slip rings 17, while a pulley (not referenced) is secured to the front end of the shaft 15. This pulley is intended to receive a belt forming part of a transmission driven by the internal combustion engine of the motor vehicle. The axis X-X constitutes the axis of the shaft 15 and the axis of axial symmetry of the alternator.

The stator 12 is made up of a body 19 which in this instance consists mainly of an axial stack of transverse soft iron laminations. In a way known per se, laminations of the stator 12 each comprise notches to form slots which in this instance are axial. These notches open at the inner periphery of the body 19 which is of cylindrical shape.

The notches extend radially toward the outside and accommodate electrically conducting axial strands of a rotor coil 23. The grooves are semi-closed on the inside as visible, for example, in document FR A 2 603 429.

The electric coil 23 is, for each phase of the alternator, made up for example of a spiral winding of an electrically conducting wire, in this case a copper wire, which is coated with at least one layer of electrically insulating material, for example a polyester in two layers, one of the polyimide type and the other of the polyamide imide type.

An electric [sic] insulating sheet is inserted in each notch of the body 19 of the stator 12 between the electric coil 23 and the body 19 of the stator 12.

This insulating sheet is immobilized [lacuna] as described in document WO 02/29958 to reduce noise and the sound levels emitted by the alternator 10, [lacuna] makes it possible to reduce or eliminate the risk of short-circuit between the coil 23 and the body 19.

Because of the winding of the electrically conducting wire, the coil 23 therefore in each notch of the body 19 of the stator 12 comprises a bundle of electrically conducting elements which pass axially through the notches of the body 19 and are extended outside of the body 19 by joining strands which form lead-outs 39 projecting from each side of this body 19 as shown in FIG. 3.

As an alternative, recourse is had to pins of circular or rectangular cross section mounted in the notches forming the axial grooves of the stator 12 as described in document WO-92/06527. As an alternative, four electrically conducting elements, such as pins of rectangular section and U-shape are mounted radially in superposition per notch as described in document FR-A-2 819 117. In all cases, the stator 12 has windings constituting the coil 23. These stator windings are fixed on the portions 16, 18 described hereinafter.

The inductor rotor 13 is, in this instance, a claw-pole rotor of the Lundell type which consists of a cylindrical electric coil 62 mounted between the two metal dishes 64 and 66 each comprising claws 68 and 70 respectively, which extend axially toward the other dish 66 and 64. Each plate-claw assembly constitutes a pole wheel, in this instance made of magnetic steel. A core 67, in this instance also made of magnetic steel, is inserted axially between the dishes 66, 64 to carry the coil 62. The core 67 is of annular shape oriented axially and in this instance is in the form of a thick washer. This core 67 is separate from the pole wheels in order to facilitate the winding of the electrically conducting element onto the core 67 without the claws 68, 70 constituting an impediment. Each pole wheel is fixed to the shaft 15 via knurled parts of the shaft, one of the which serves to attach the core 67. The claws 68 and 70 are angularly offset from one another so that a claw 68 of the dish 64 is inserted between two adjacent claws 70 of the dish 66, and vice versa. The claws have chamfers (not referenced) to reduce the magnetic noise as in document EP-B-0 515 259.

The alternator in this instance has internal ventilation, each dish 64, 66 carrying a fan 102, 104 respectively, adjacent to the portion 16, 18 of the casing concerned. Each portion 16, 18 of the casing 12 is perforated so that air can circulate and centrally bears a bearing in the form of a ball bearing 105, 106 respectively, to support the front end and rear end of the shaft 15, respectively. Thus, one 18, of these portions 16, 18 is known as the front bearing (the one adjacent to the pulley) and the other 16, is known as the rear bearing. It will be noted that this pulley is fixed by a nut onto the threaded front end of the shaft 15. In the upper part of FIG. 3, a spacer piece of angle bracket cross section is inserted between the inner race of the bearing 105 and the pulley. In the lower part of this FIG. 3, the spacer piece is incorporated into the pulley, making it possible to reduce the axial bulk still further.

The bearings 16, 18 have a hollow shape and each have a closed end in the form of a dish oriented transversely to the axis X-X of the alternator and, at their outer periphery, an axially directed annular rim each having its own machined annular radial end face 26, 28, delimiting a joining plane. The bearings are connected to each other by fixing screws 29.

Each axially directed rim is connected at its other axial end to the transversely oriented dish which centrally bears the relevant ball bearing 105, 106. In a known way, each dish and each rim respectively have air inlet openings and air outlet openings for the air circulation. FIG. 3 shows some of the air inlet openings made in the dishes of the bearings 16, 18, particularly the openings 7 made in the dish 3 of the rear bearing 16, and dotted line has been used to depict two air outlet openings, of the type of the opening 4 of FIG. 1, in the peripheral rims of the bearings 16, 18.

The air outlet openings in the rims are located facing the lead-outs 39.

The fans 102, 104 are located radially under the lead-outs 39 being fixed, for example by spot welding, to the dish 64 and the dish 66 respectively. These fans 102, 104, secured to the rotor 13, have blades advantageously distributed unevenly so as to reduce noise, and in this instance are of the centrifugal type. Air is thus drawn in and passes through the openings in the dishes to be delivered through the openings, in this instance of oblong shape, in the peripheral rims.

The fans may comprise two series of blades as described in document FR00 08549 filed on Jun. 30, 2000 and published under the number FR-A-2 811 156.

More specifically, the second series of blades is shorter than the first series of blades and at least one second blade is inserted between two consecutive blades of the first series of blades.

For further details reference can be made to that document. All the alternative forms in that document being conceivable. [sic] Thus, a cover may cover the first series of blades.

The lead-outs 39 are therefore well cooled as is the rectifier arrangement 1, the voltage regulator 116 that the alternator 10 has and the ball bearings 105, 106.

The rear bearing 16 bears a rectifier arrangement 1 which rectifies the AC current produced by the coil 23 of the stator 12, in this instance three-phase, and a brush holder collaborating with the slip rings 17. By virtue of the arrangement 1, the AC current produced by the coil 23 is converted into DC current to recharge the vehicle battery and power the consumers, such as the lighting device, the climate control device, etc.

In the known way, the slip rings 17 are connected to the ends of the excitation coil 62 of the rotor 13 by wire connections passing behind the fan 104, as visible in this FIG. 3. When the coil 62 is activated, magnetic poles are formed at the claws 68, 70 in the known way.

Also provided is a protective cover 27, perforated in the way described hereinafter so that air can circulate.

This cover 27, in this instance made of plastic, covers the brush holder, connected in a known way to the voltage regulator 116, and the rectifier arrangement provided with diodes.

The brushes of the brush holder collaborate in rubbing against the rings 17. The regulator device allows the voltage supplied by the stator to be limited in order in particular to protect the battery.

The bearings 16, 18 have lugs to fix them to a fixed part of the vehicle and they are connected together by a fastening in this instance using screws one of which can be seen in FIG. 3. The vehicle alternator is therefore electrically connected to ground via its bearings 16, 18.

As an alternative, the dishes of the bearings are axially inclined.

As an alternative, the fan 102 is omitted in the knowledge that the rear fan is more powerful.

In general, the alternator comprises at least one internal fan 13 secured to the rotor and installed inside the casing underneath a lead-out 39 in such a way that the coil 23 is well cooled and that the alternator is of high power while at the same time being compact particularly in axial terms and not very noisy.

As an alternative, a single fan is installed on the outside at the pulley.

Figure 4:
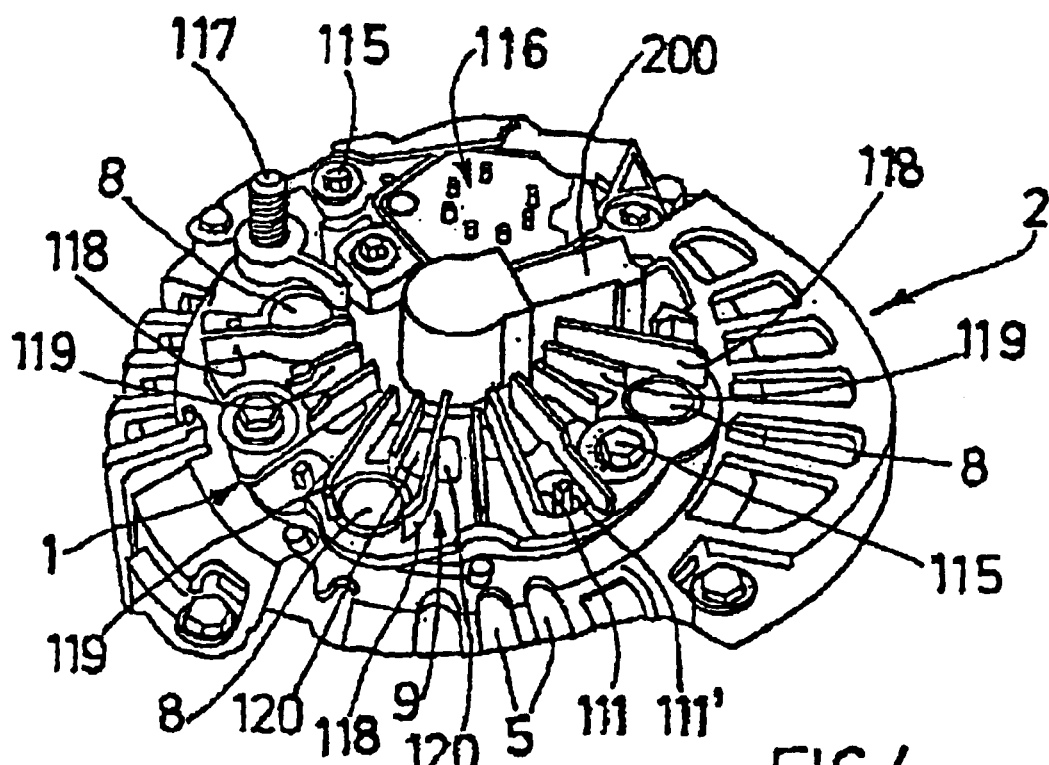
FIG. 4 is a partial perspective view of the rectifier arrangement of FIG. 3, without the cover.
Figure 5:
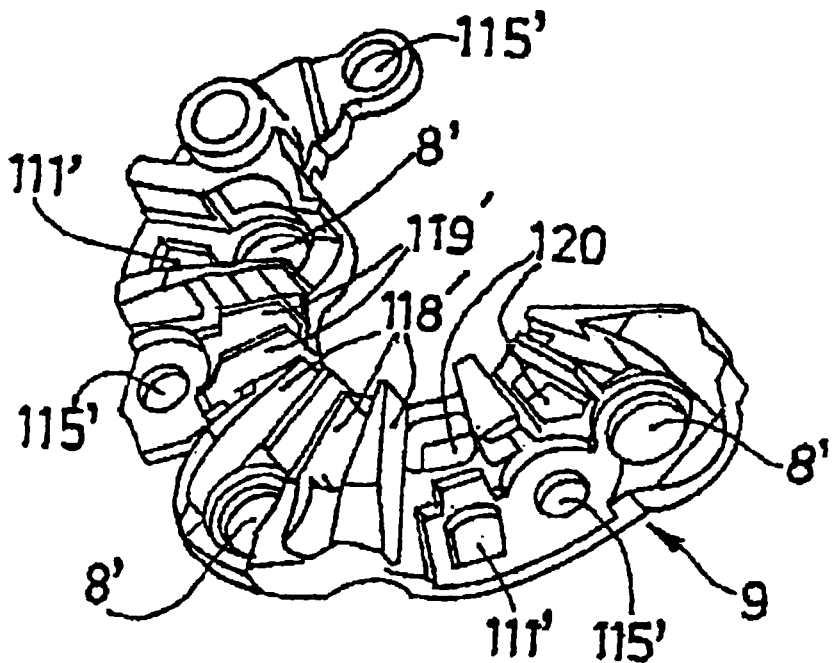
FIG. 5 is a perspective view of a heat dissipater of the rectifier arrangement according to FIG. 4.
Figures 6, 7, 8:
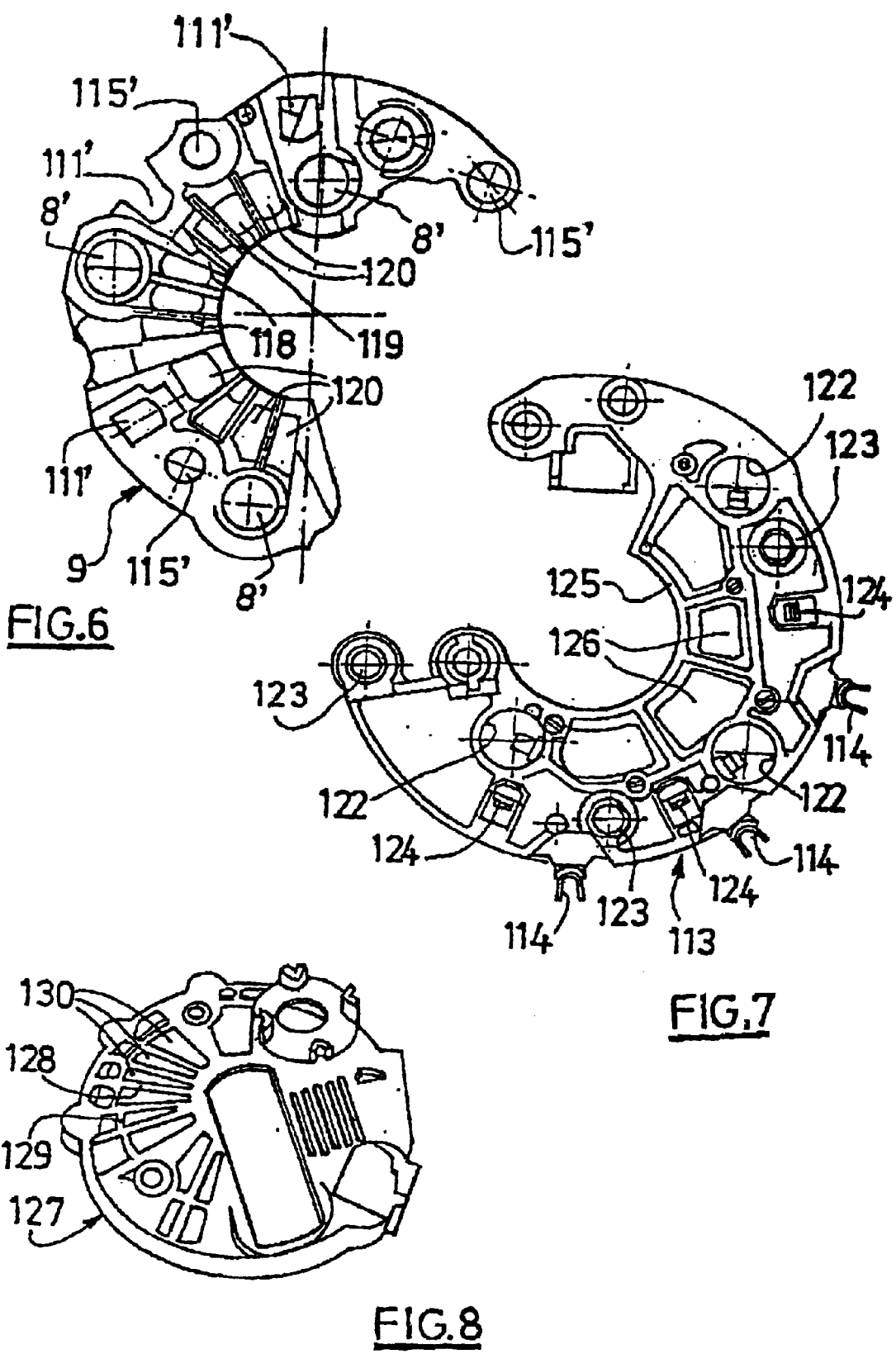
FIG. 6 is a view from above of the dissipater according to FIG. 5.
FIG. 7 is a view from above of an insulating intermediate plate of the rectifier arrangement according to FIG. 4.
FIG. 8 is a perspective view of a protective cover intended to fit over the rectifier arrangement according to FIG. 4.

The invention relates in particular to the embodiment of the plate 9 forming a support for the positive diodes 8 and constituting a dissipater of heat. According to one feature, this plate 9 is arranged to provide better dissipation of heat and will be known as a heat dissipater. As can be seen in FIGS. 4 to 6, the rectifier arrangement according to the invention may confine itself to three positive diodes 8, because of the optimization of the cooling afforded by the invention. Unlike in FIG. 1, two of these diodes 8 are arranged near the outer periphery of the plate, practically on the same circle as the holes 111' of the tails 111 of the negative diodes and the screws 115 that fix the rectifier arrangement to the rear bearing. The third diode is arranged near the terminal 117, known as the positive terminal. More specifically, the plate has an extension near the terminal 117, for fixing it to the dish 3.

The holes into which the diodes are forcibly inserted bearing the reference 8' and the holes for the passage of the screws 115 are marked as 115'. As can be seen clearly in the figures, the central part of the dissipater 9 is therefore clear.

The upper face of the dissipater 9 bears a multitude of fins 118, 119 which project at right angles to the face of the plate and extend practically radially from the radial inner edge of the plate, the fins 118, known as first fins, extending, according to one feature of the invention, practically as far as the outer periphery of the dissipating plate, the other fins 119, known as second fins, extending as far as the holes that accommodate the diodes, the fixing screws and through which the tails of the negative diodes pass.

Here, some of the second fins 119, shorter than the first fins 118, extend according to the invention up close to the positive diodes 8 arranged at the outer periphery plate 9 for good cooling of the latter. Other second fins 19 extend up close to the fixing screws 115.

It can be seen that the central positive diode 8 is situated between two long fins 118, shaped at their outer periphery to surround the central diode 8 as closely as possible and that one of the long fins 118 is near the other two diodes 8. The fins 118 associated with the central positive diode 8 are curved at their outer periphery, one of them toward the other in order better to surround this central diode. In the example depicted, twelve fins 118, 119 are provided on the plate-shaped dissipater 9. Fins are provided on both sides of the plate. FIG. 5 reveals that some fins are wider so as to increase the mass of the plate 9.

More specifically, to allow an even better removal of heat, the underside, facing toward the dish 3 of the plate 9 is provided with long fins 1119'[sic] and short fins 118' like the upper face. Some of the fins 119', 118' are very wide.

As shown clearly in the figures, the plate is pierced between the fins in the area available. These openings 120 constitute, with the inwardly converging radial fins 118, 119, axial cooling channels which ensure accelerated flow of cooling air drawn in via the internal fan and then delivered through the lateral openings 5 in the bearing.

FIG. 7 illustrates the intermediate insulating plate 13 which, in the way corresponding to the plate 9 supporting the positive diodes, has holes 122 for the passage of the tails of the positive diodes 8, holes 123 for the passage of the fixing screws 115, and holes 124 for the passage of the tails for the passage [sic] of the negative diodes 10, all in the outer annular region near its periphery, the annular part 125 situated further in being provided with wide openings 126 for the flow of the cooling air and the arrangement of which corresponds to the openings 120 of the plate 8. In the context of the invention it could be conceivable for this annular part 125 of the insulating plate to be dispensed with, thus making it possible to reduce the size of the plate 13.

In a known way, the heads of the screws 115 bear against the end of a housing belonging to the plate 113, to clamp the plate 9 into contact with the plate 113.

FIG. 8 shows a protective cover 27 in the form of a cup intended to cap the rectifier arrangement according to the invention, which differs through its optimized configuration, perfectly suited to the dissipater because its part situated above the latter is highly perforated leaving only narrow radial ribs 128 and one, also narrow, coaxial rib 129. The large openings 130 thus obtained, which extend radially like the cooling fins 119, 118, ensure purely axial accelerated flow of the cooling air drawn in and thus optimum cooling of the rectifier arrangement of the alternator according to the invention. It will be noted that it is only the part forming the transversely oriented central dished part of the cover 27 which has the openings, the axially oriented annular rim of the cover, connected to the outer periphery of the central dish, having no openings. The air therefore passes axially through the opening 130 and 120 in the knowledge that the openings 120 face the openings 7 of the rear bearing.

It will the noted that the thickness of the ribs, or radial strip of material 128, is dependent on the thickness of the fins 118, 119, in this instance being generally equal thereto. The ribs 128 face the fins 118, 119.

Here, the rib or strip of material 129 is circularly continuous which means that the openings 130 are divided into two. A first part of the openings 130 faces the openings 120 of the plate 9, each advantageously having a radial length or height greater than that of an opening 120. The rib 129 extends over the openings 120 so that the second part of the openings 130 faces, in particular, the two positive diodes 8 installed at the outer periphery of the plate 9.

The plate 9 is thus well cooled and the cover 27 is stronger. In a known way, the cover 27 is fixed by clip-fastening onto the screws 115 which are provided for that purpose with a threaded part as described in document WO01/69762.

The axially directed annular rim of the cover 27 here has no openings.

Figure 9:
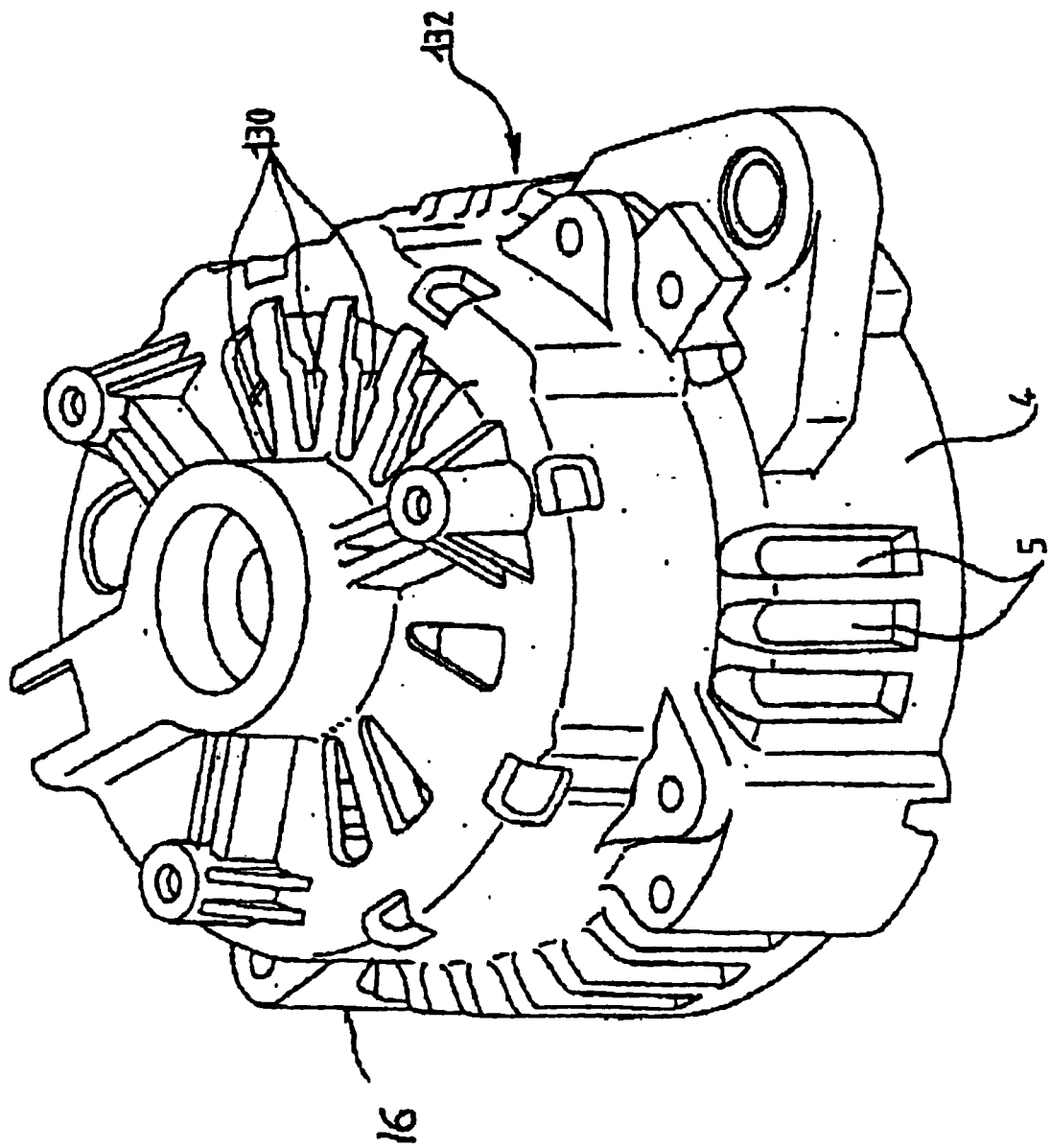
FIG. 9 is a perspective view of an alternator rear bearing, with a built-in protective cover, according to another embodiment of the invention.

FIG. 9 illustrates an integrated version 132 of the assembly formed by the rear bearing and the cover protecting the rectifier arrangement, with axial flow openings 132 in the part covering the dissipater of the rectifier arrangement which is fixed inside the assembly. In this case, the negative diodes are mounted on a plate which has the configuration of the dish 3 of FIG. 1. This plate is fixed to the rear bearing by any means, in the knowledge that this rear bearing 16 is connected to ground. The cover 132 therefore advantageously has additional thicknesses in the form of ribs starting from a tubular portion projecting out axially with respect to the central part of the cover constituting the closed end of the rear bearing. These ribs are connected at their free end to fixing shafts. Thus, the alternator can, by means of its rotor shaft, drive a vacuum pump. For simplicity, the ribs, the tubular portion and the fixing shafts have not been referenced.

In all cases, the rectifier arrangement comprises a dissipater 9 in the form of a holed plate with radial fins, a plate 13 with connectors and a third constituting the support for the negative diodes, which is formed by the rear bearing or a plate secured to the rear bearing. Recourse is therefore had to three main parts unlike in the embodiment described in the aforementioned document DE-A-19705228 in which the connector is mounted over the plate bearing the positive diodes and impedes ventilation. In the present invention, the connector 13 [lacuna] inserted between the dissipation 9 and the dish 3 of the rear bearing or a plate secured thereto. Radial channels are formed between the fins. The tails of the positive diodes are directed toward the support of the negative diodes. Two or fewer of the positive diodes extend over the openings 120.

It is apparent from the description of the invention which has just been given that, by virtue of the radial fins and of the openings made between these, of the dissipater supporting the positive diodes, accelerated and therefore optimized flow of the cooling air is obtained, the openings made facing each other in the bearing and in the insulating plate forming a connector contributing to this. Given that the positive diodes are arranged near the outer periphery of the support plate, the connector may have a small size. It must be noted that all the openings are configured in such a way that they reduce pressure drops by facilitating air flow. It must also be emphasized that the openings in the cover are aligned with the fins of the dissipater supporting the positive diodes.

The fact that the fins 118, 119 converge toward the inside allows the flow of the cooling fluid, in this instance air but, as an alternative some other fluid, to be accelerated. The device of two of the positive diodes at the outer periphery of the dissipater 9 makes it possible to increase the thickness of the dissipater 9 at this point, by creating on the latter, for example, an additional thickness of trapezoidal overall cross section. Thus the heat is better removed and the plate 9 is stiffened. Advantageously, the dissipation 9 is obtained by molding, based on aluminum.

It will be noted that the references 46, 50, 34 of FIG. 3 respectively denote a flat annular seal, thermally conducting resin and pads as described in document WO02/29958.

The seal 46 is inserted axially between the body 19 and an unreferenced shoulder of the rim of the front bearing 18.

The resin is inserted radially between the inner periphery of the rim of the bearing 18 and the outer periphery of the body 19.

Pads 34 inserted axially between the body 19 and a shoulder of the rim (not referenced) of the rear bearing. The pads 34 are made of elastic material like the seal 46.

They are, for example, based on elastomer.

The pads 34 have lugs 38 for mounting them in complementary housings belonging to the rear bearing 16 as visible in document WO02/29958. Mechanical decoupling between stator and bearings 16, 18 is thus obtained, the resin 50 deforming elastically in radial direction.

The alternator is thus less noisy. The resin 50 allows heat to be removed well so that the rotor, particularly the coil 62 thereof, can be more powerful.

All this is made possible by virtue of the rectifier arrangement 1 according to the invention which is able to remove more heat.

Advantageously, the electric coils 23 and/or 62 are shaped using a shaping tool which exerts force on at least one region of a coil so as to deform it. Here, the size of the coil 62 is increased, the outer periphery thereof having a convex shape, or as an alternative a barrel shape, so that its volume is increased as is the alternator power allowed by virtue of the arrangement 1 according to the invention.

For greater detail, reference can be made to document WO02/2958 [sic], the coils 23, 62 being mounted respectively in the notches of the body 19 and on the core 67 via an insulating sheet covered with a binding material such as a polymer, advantageously of the thermoset type. By heating, the coil 23, 62 is bound respectively to the body 23 and to the core 67.

Pins may be used to form the coil 62. All this is possible by virtue of the arrangement 1.

By virtue of the invention, the alternator is more powerful and less noisy. Of course, the presence of the resin 50, of the pads 34 and of the seal 46 is not compulsory. Likewise ?[sic], as described in document FR 01 07178 filed on May 31, 2001, the coil 62 is, as an alternative, produced by winding the conducting element over a tubular element mounted on the core 67 which is then made in two parts; each part starting out from one of the dishes 66, 64.

What is claimed is:

1. Rotary electric machine of the type comprising a stator (12) with windings, a rotor (13) provided with a rotary shaft (15), a front bearing and a rear bearing on which the stator windings are fixed and in which the rotor shaft is mounted so that it can rotate, an arrangement for rectifying the current produced by the rotary electric machine, which comprises a number of positive diodes supported by a heat dissipater in the overall form of a support plate and a number of negative diodes supported by support means in the form of a plate advantageously forming part of the rear bearing, these plates being axially juxtaposed and fixed to the rear bearing, and a device providing cooling by circulating an axial stream of a cooling fluid through axial openings in said plates, at least some openings in the plate (9) supporting the positive diodes (8) being provided with a great many cooling ribs which have the shape of fins (118, 119) extending practically radially across the support plate from the radially inner edge thereof, an opening (120) for the passage of the cooling fluid advantageously being provided between each pair of adjacent fins (118, 119), characterized in that some fins (118), known as first fins, extend practically as far as the outer periphery of the plate (9) supporting the positive diodes (8).

2. Machine according to claim 1, characterized in that at least two positive diodes (8) are arranged near the outer periphery of the plate (9) supporting the positive diodes (8), and in that other fins (119), known as second fins, extend up close to these diodes.

3. Machine according to claim 2, characterized in that the openings (120) in the plate (9) supporting the positive diodes (8) constitute, with the adjacent fins (118, 119), channels for the accelerated flow of the cooling liquid.

4. Machine according to claim 1, characterized in that at least a first fin (118) which extends radially as far as the outer periphery of the support plate (9) is near a positive diode (8).

5. Machine according to claim 4, characterized in that the support plate (9) has an additional thickness in the region of the positive diode.

6. Machine according to claim 1, characterized in that a plate (13) made of an electrically insulating material is inserted between the plates (9, 3) supporting the positive diodes (8) and is configured to allow cooling fluid to pass freely in its portion situated beneath the part of the plate (9) supporting the positive diodes (8) which has the openings (120) for the passage of the cooling air.

7. Machine according to claim 1, characterized in that it comprises a cover part which, in the region of the fins (118, 119) of the plate (9) supporting the positive diodes (8), has corresponding radial openings.

\* \* \* \* \*